United States Patent
Cathro et al.

(10) Patent No.: US 9,098,362 B1
(45) Date of Patent: Aug. 4, 2015

(54) OPERATING SYSTEM (OS) INDEPENDENT APPLICATION AND DEVICE COMMUNICATION

(71) Applicant: NCR Corporation, Duluth, GA (US)

(72) Inventors: Ian Cathro, Dundee (GB); Brian Spohn, Suwanee, GA (US)

(73) Assignee: NCR Corporation, Duluth, GA (US)

( * ) Notice: Subject to any disclaimer, the term of this patent is extended or adjusted under 35 U.S.C. 154(b) by 0 days.

(21) Appl. No.: 14/290,177

(22) Filed: May 29, 2014

(51) Int. Cl.
*G06F 3/00* (2006.01)
*G06F 9/44* (2006.01)
*G06F 9/46* (2006.01)
*G06F 13/00* (2006.01)
*G06F 9/54* (2006.01)

(52) U.S. Cl.
CPC ............... *G06F 9/546* (2013.01); *G06F 9/541* (2013.01)

(58) Field of Classification Search
None
See application file for complete search history.

(56) References Cited

U.S. PATENT DOCUMENTS

| 6,809,830 | B1 * | 10/2004 | Lafky | 358/1.13 |
| 7,365,868 | B2 * | 4/2008 | Tomomatsu | 358/1.13 |
| 2005/0015702 | A1 * | 1/2005 | Shier et al. | 714/776 |
| 2011/0085568 | A1 * | 4/2011 | Gnanasekaran et al. | 370/419 |

* cited by examiner

*Primary Examiner* — Craig Dorais
(74) *Attorney, Agent, or Firm* — Paul W. Martin (57) ABSTRACT

An Inter-Process Communication (IPC) message transport mechanism is provided with an Application Programming Interface (API). Applications use the API to create and register clients, and device drivers for devices use the API to create and register services. The applications and device drivers use their own independent API to pass commands and responses to one another using the clients and services. An IPC message transport manager manages and routes the commands as messages without any restrictions on the format or content of the messages. The messages routed in an OS independent fashion.

17 Claims, 4 Drawing Sheets

OPERATING SYSTEM (OS) INDEPENDENT APPLICATION AND DEVICE COMMUNICATION

BACKGROUND

Enterprises often deploy a variety of devices and applications within their processing environments. Generally, each business vertical has to support some form of an industry standard Application Programming Interface (API) at a business's application level (e.g., financial solutions often support CEN XFS (eXtensions for Financial Services) and retail solutions support OPOS (Object Linking and Embedding (OLE) for retail POS), etc.). In order for applications to share device hardware with device driver implementations a custom and proprietary interface is required.

As a result, when new device hardware is introduced, updates to existing device hardware is made, or existing device hardware is needed in a new OS platform, businesses have to wait on support from their industry standard APIs or have to custom code individual applications to provide support. This creates time lags waiting on support and is not conducive to code reuse and portability.

Even though the third-party APIs were meant to create better integration for applications, since they are so tightly coupled to the underlying devices in which they support and the OSs on which they run, the applications are still tightly coupled to their OS environments and environmental configurations. Moreover, applications from different configurations or different business units that want to access devices used by other business units require substantial modification to achieve such access.

Moreover, third-party APIs are OS specific, which means different OSs require different modifications for any third-party API to work properly, and some APIs may not even support a desired OS of an enterprise. Still further, even when a third-party API has versions of that API for multiple OSs, each such version may have different commands or different features from the other versions. This means that trying to allow an application using a first OS having a first API (supported by the first OS) to access a device available from a second OS have a second API (supported by the second OS) is not seamless and requires a lot of programming rework and integration. So, device sharing across OS environments is uncommon in the industry.

SUMMARY

In various embodiments, methods and a Self-Service Terminal (SST) for Operating System (OS) independent application and device communication are presented.

According to an embodiment, a method providing an OS independent application and device communication is presented. An Application Programming Interface (API) is provided to a client application and a device driver. Next, objects are instantiated and registered through the API that permit the client application and the device driver to communicate with one another through messages in formats defined by the client application and the device driver, wherein the messages are relayed and managed independent of a specific Operating System (OS).

DETAILED DESCRIPTION

Figure 1:
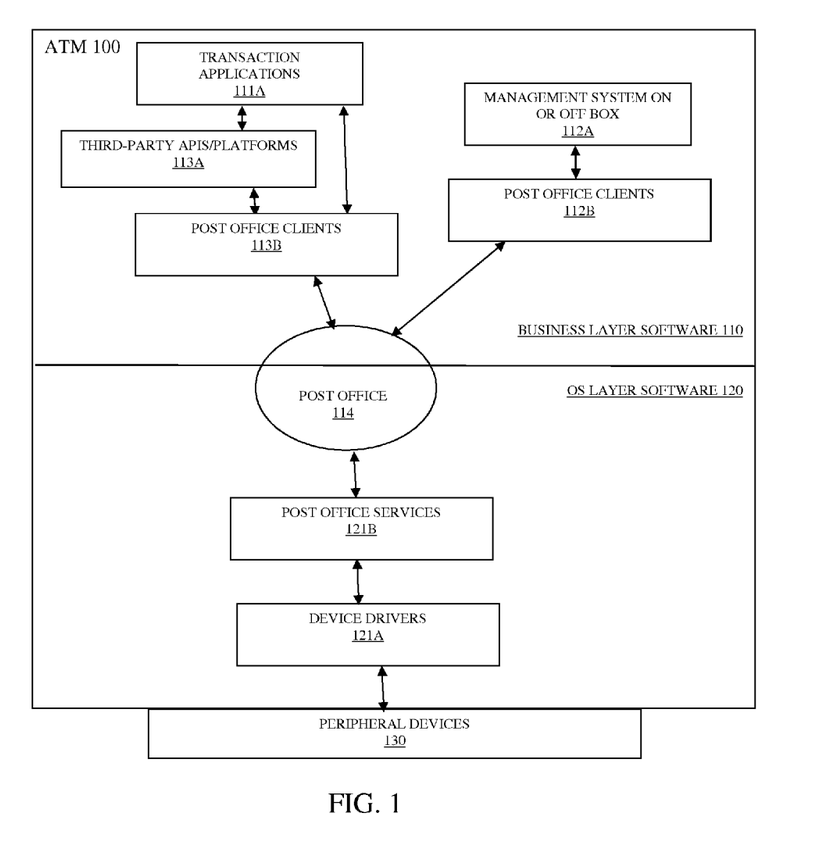
FIG. 1 is a diagram of an Automated Teller Machine (ATM) having Operating System (OS) independent application and device communications, according to an example embodiment.

FIG. 1 is a diagram of an Automated Teller Machine (ATM) having Operating System (OS) independent application and device communications, according to an example embodiment. It is to be noted that the components of the ATM 100 are shown in greatly simplified form, which just those components necessary for understanding the embodiments illustrated.

Before beginning the discussion of the ATM 100, some terms are introduced and defined that may be used throughout this document.

A "device driver" is a driver that provides an interface to one or more peripheral devices. The device drivers (discussed herein) also expose the functionality of the underlying peripheral devices in a normalized interface communicated to applications, which operate within an application layer of the OS. The device driver operates within a different processing context within the OS than the applications (may also be referred to herein as client applications).

As used herein and below a "peripheral device" can be: a physical device, a virtual device being a logical representation of a peripheral device, or a compound peripheral device (a peripheral device that supports two or more discrete, logical device functional operations that have been made independent because of design choice, such as shared Input/Output (I/O) connection or shared transport mechanism).

A "post office" is the interface between the applications and the drivers. The post office acts as an Inter-Process Communication (IPC) transport through an API to pass messages and events between post office clients and post office services. The post office also maintains address mappings between post office clients and post office services, and registers post office clients and post office services. The post office is not dependent on any specific format of the messages used between the post office clients and the post office services. In this way, the post office is API agnostic and OS agnostic because it serves as an IPC transport between different independent OS processing contexts between the post office clients and the post office services.

A "post office client" is created by client applications (including third-party APIs/platforms and management systems) through the post office API and registered with the post office for sending messages, receiving replies from post office services, and receiving events from the post office services.

A "post office service" is created by device drivers through the post office API and registered with the post office for receiving messages from post office clients, sending replies to messages, and sending events.

"Business layer software" refers to the applications, third-party APIs/platforms, and/or management systems processing context and application layer within the OS, which sits above the OS layer software, where the device driver is processed.

It is within this initial context that the FIGS. are now discussed with initial reference to the FIG. 1.

The ATM 100 includes and is logically segmented into business layer software 110 and OS layer software 120. The business layer software 110 includes a variety of transaction applications 111A (business or client applications relevant to transactions on the ATM 100), a management system on-box of off-box 112A (for management operations of the ATM 100), third party APIs/Platforms 113A (such as XFS, OPOS, JAVAPOS, and all the flavors or personalities associated with modifications/customizations to these third party APIs/Platforms 113A).

The business layer software 110 also includes one or more post office clients 112B and 113B.

The OS layer software 120 includes a post office 114 (that can also operate within the business layer software 110 environment to communication with the business layer software 110 (acting as an IPC transport layer). Similarly, the OS layer software 120 includes one or more device drivers 121A and one or more post office services 121B.

During operation of the ATM 100, the business layer software 110 (111A, 112A, and 113A) make requests for access to the peripheral devices 130 (card reader, value media dispenser, receipt printer, etc.). The transaction applications 111A may be coded to communicate with the third-party APIs/Platforms 113A (XFS, OPOS, JAVAPOS, or personalities thereof) to make such requests of the peripheral devices 130. The third-party APIs/Platforms 113A.

With the teachings herein modification of communication between the client applications (111A, 112A, and 113A) are modified to achieve the described novel and new beneficial teachings to achieve OS independent application to device communications through the post office 114 and its post office clients (112B and 113B) and its post office services 121B.

As stated before, the post office 114 is a collection of software services that is accessed and interacted with through a post office API. The post office 114 allows device drivers 121A to offer functionality known for the peripheral devices 130 to the client applications (111A, 112A, and 113A) while at the same time the post office 114 remains conceptually and logically separated from the normalized interface or device driver and client application API used by the device drivers 121A and the client applications (111A, 112A, and 113A) to communicate with one another. That is, the post office 114 is not dependent on and is agnostic to the format of the normalized interfaced used between the client applications (111A, 112A, and 113A) and the device drivers 121A.

The device drivers 121A use the post office API to create and register post office services 121B. This allows the post office clients (112B and 113B) to detect the presence of the device drivers 121A and provides a generic IPC (cross OS processing contexts) mechanism for communication with one another through the post office 114. Device drivers 121A register when they want to expose functionality of the peripheral devices that they support to the post office clients (112B and 113B). The post office services 121B provides the mechanism by which the device drivers 121A obtain post office client request messages and send appropriate response messages (as obtained by the device drivers 121A interacting with their peripheral devices 130). The post office services 121B also provides the mechanism by which the device drivers 121A send asynchronous even messages to a specific post office client (112B or 113B), and the mechanism by which the device drivers 121A broadcast asynchronous event messages to monitoring or subscribing post office clients (112B and 113B).

The post office 114 provides an IPC transport mechanism for different OS processing contexts (business layer software 110 and OS layer software 120). So, client users of the post office 114 do not have to be in the same OS process in order for them to send messages to one another. Thus, by using the post office 114 device drivers 121A can reside in a different OS processing context from the client applications (111A, 112A, and 113A).

The post office 114 is a transport layer achieved via the post office API for facilitating the passing of message data between the device drivers 121A and the client applications (111A, 112A, and 113A); thus, the post office 114 does not impose, or expect, the messages that pass through to be in any particular format. So, the post office 114 is message format independent and device-driver and client application API independent (since it is the device-driver and client application API that creates the message in the message format).

There are two types of post office interface modules (the post office client (112B and 113B) and the post office service 121B):

Post office client (112B and 113B) makes use of one or more post office services 121B. A post office client (112B and 113B) drives and controls a post office service 121B by sending it request messages and determining the request outcome by subsequently receiving response messages and event messages from the post office service 121B. Business layer software 110 that wants to use a device driver 121A has to create and to register at least one post office client (112B and 113B) using the post office API.

Post office service 121B is the mechanism by which the device drivers 121A expose the functionality of their peripheral devices 130 to one or more post office clients (112B and 113B); thus, the post office service 121B provides a service. The functionality provided by post office services 121B can be varied. Each device driver 121A creates at least one post office service 121B using the post office API. There is a direct one-to-one mapping between the number of services that a device driver 121A supports and the number of post office services 121B that are supported by the device driver 121A. This means that a device driver 121A service exposes the functionality that it provides to client users through its post office service 121B.

Logical software components other than a device driver 121A may also support a post office service 121B, as logical services (not shown in the FIG. 1).

Central to the post office 114 is the identification of the post office clients (112B and 113B) and the post office services 121B. The post office 114 relies on a post office client (112B and 113B) to register itself with the post office's client catalog, and a post office service 121B to register itself with the post office's service catalog. Whenever a post office client (112B or 113B) or post office service 121B registers with the appropriate post office catalog it will be identified by a numeric value called a system address. A system address is akin to a handle for files and other objects. The post office 114 keeps records of associations between system addresses of post office clients (112B and 113B) and post office services 121B. A post office client (112B or 113B) uses the post office service Catalog to determine what post office services 121B are available for it to use.

The post office 114 places no restrictions on the message format, the size of message that can be sent to/from its post office clients (112B and 113B) and post office services 121B, or the frequency (rate or volume) that messages are sent by post office clients (112B and 113B) and post office services 121B. However, it is expected that the size of a message is minimal in nature and consideration is given to the frequency at which messages are issued to and from post office services 121B. The size of the message can be a configured attribute based on the processing environment.

The messaging passing facilitated by the post office 114 may or may not exist in a same thread or process. There are two types of messages used, a two-message sequence and a one-message sequence.

In a two-message sequence a post office client (112B or 113B—originated from client application (111A, 112A, and 113A) sends a request message to a post office service 121B and the post office service 121B responds by sending a response message to the post office client (112B or 113B). The format of both a request message and response message is pre-defined; by the writer of the service, not the post office 114. The post office client (112B or 113B) can participate in many two-message sequences at a time and two-message sequences can be interleaved in two ways:

1. The post office client (112B and 113B) can send a request message to a particular post office service 121B before collecting the response message associated with a previous request message from that service. Note that the outstanding response message may or may not have been already sent by the post office service 121B.

2. Before collecting the response message associated with a request message it sent to a post office service 121B, the post office client (112B or 113B) can send a request message to another post office service 121B.

A one-message sequence can occur between a post office service 121B and a post office client (112B or 113B). In an embodiment, the post office 114 supports two types of one-message sequence:

1. Event Message. This message occurs between a post office service 121B and a post office client (112B or 113B) when the post office service 121B sends an event message to the post office client (112B or 113B).

2. Broadcast Message. This message occurs between a post office service 121B and post office client (112B or 113B) monitors when the service sends a broadcast message.

By default, messages are received by post office client (112B and 113B) in the chronological order that they have been sent. However if a post office client (112B or 113B) chooses to, it can request to receive a particular post office service 121B response message. In this case other messages received before the post office client (112B or 113B) specified message will be queued within the post office 114 for the post office client (112B or 113B) to receive later.

Post office services 121B always receive messages in the chronological order that they have been sent.

As discussed, when a message is sent by a post office client (112B or 113B) or a post office service 121B it is queued within the post office 114. The number of messages that can be queued by the post office 114 at any point in time is configurable; but due to resource requirements there is a maximum limit. A message will be kept on a queue within the post office 114 for a configurable period of time. If no post office client (112B or 113B) or post office service 121B picks up the message during this period, then the message will be deleted from the queue.

The post office 114 does not define or impose the format of the messages passed between post office clients (112B and 113B) and post office services 121B. The post office 114 does not impose a maximum size of message. However, the post office 114 does have a finite amount of space to store messages that are being passed through it at any point in time; messages that are to be routed to the appropriate post office clients (112B and 113B) and post office services 121B. When a post office client (112B or 113B) or post office service 121B sends a message, and there is no space available within the post office 114 to handle the message, the post office 114 will scan the current message queue. If the post office 114 finds any message on the queue that has not been picked up within a configurable period of time then the message will be removed from the queue. After purging any time lapsed messages, if there is still no space available for passing the message to be sent, then the post office client (112B or 113B) or post office service 121B will be informed of this with an out of memory condition.

During operation of the ATM 110 the client applications (111A, 112A, and 113A) detect the presence of peripherals 130 through the device drivers 121A through the IPC transport message passing of the post office 114 utilizing the post office services 121B and the post office clients (112B and 113B). The format of the messages and the API used between the client applications (111A, 112A, and 113A) and the device driver 121A are irrelevant to and no restrictions are enforced on these items by the post office 114. The post office API used by the client applications (111A, 112A, and 113A) and the device drivers 121A permits the creation or and registration of the post office clients (112B and 113B) and the post office services 121B. This IPC message passing mechanism between applications and device drivers permits OS-independent and application to device API independence (meaning the applications and devices are free to use existing APIs to communicate as they normally would with one another.

These embodiments and other embodiments are now discussed with reference to the FIGS. 2-4.

Figure 2:
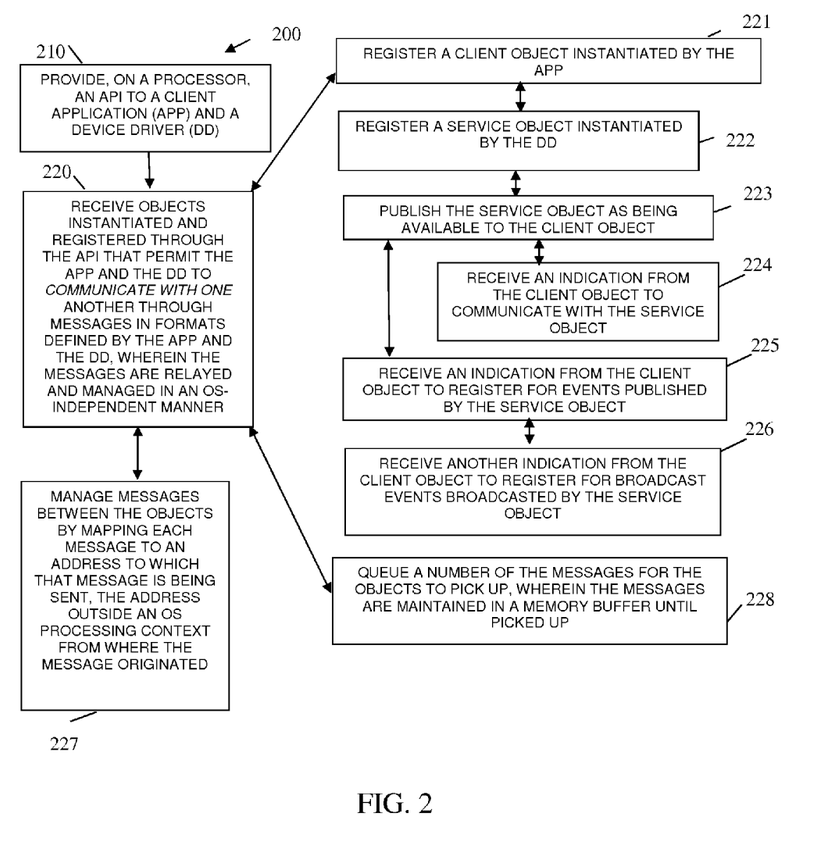
FIG. 2 is a diagram of a method for providing OS independent application and device communications, according to an example embodiment.

FIG. 2 is a diagram of a method 200 for providing OS independent application and device communications, according to an example embodiment. The method 200 is implemented as one or more software modules as executable instructions that are programmed within memory or non-transitory computer readable storage media and executed by a processing device. The software module(s) are referred to herein as a "messaging transport configurer." The messaging transport configurer has access to one or more networks, and such networks may be wired, wireless, or a combination of wired and wireless.

In an embodiment, the messaging transport configurer presents and processes the post office API discussed above with reference to the FIG. 1.

In an embodiment, the messaging transport configurer produces at least one instance of a post office client (112B and/or 113B) and at least one instance of a post office service 121B on a host machine that is the ATM 100.

In an embodiment, the messaging transport configurer produces at least one instance of a post office client (112B and/or 113B) and at least one instance of a post office service 121B on a host machine that is a Self-Service Terminal (SST).

In an embodiment, the messaging transport configurer produces at least one instance of a post office client (112B and/or 113B) and at least one instance of a post office service 121B on a host machine that is a kiosk.

At 210, the messaging transport configurer provides an API to a client application and a device driver.

In an embodiment, the client applications are 111A, 112A, and 113A of the FIG. 1.

In an embodiment, the device driver is the device driver 121A of the FIG. 1.

In an embodiment, the API is the API discussed above with reference to the post office 114 of the FIG. 1.

At 220, the messaging transport configurer receives objects instantiated through the API that permit the client application and the device driver to communicate with one another through messages in formats defined by the client application and the device driver. The messages relayed and managed in an OS-independent manner.

According to an embodiment, at 221, the messaging transport configurer registers a client object instantiated by the client application.

In an embodiment, the client object is an instance of the post office client (112B and/or 113B) of the FIG. 1 created by the client application using the post office 114 API.

In an embodiment of 221 and at 222, the messaging transport configurer registers a service object instantiated by the device driver.

In an embodiment, the service object is an instance of the post office service 121B of the FIG. 1 created by the device driver 121A using the post office 114 API.

In an embodiment of 222 and at 223, the messaging transport configurer publishes the service object as being available to the client object (this is done through message passing as discussed above with reference to the FIG. 1).

In an embodiment of 223 and at 224, the messaging transport configurer receives an indication from the client object to communicate with the service object.

In another embodiment of 223 and at 225, the messaging transport configurer receives an indication from the client object to register for events published by the service object.

In an embodiment of 225 and at 226, the messaging transport configurer receives another indication from the client object to register for broadcast events broadcasted by the service object.

In an embodiment, at 227, the messaging transport configurer manages messages between the object by mapping each message to an address to which that message is being sent. The address is outside an OS processing context from where the message originated.

In an embodiment, at 228, the messaging transport configurer queues a number of the messages for the object to pick up. The messages are maintained in a memory buffer until picked up.

Figure 3:
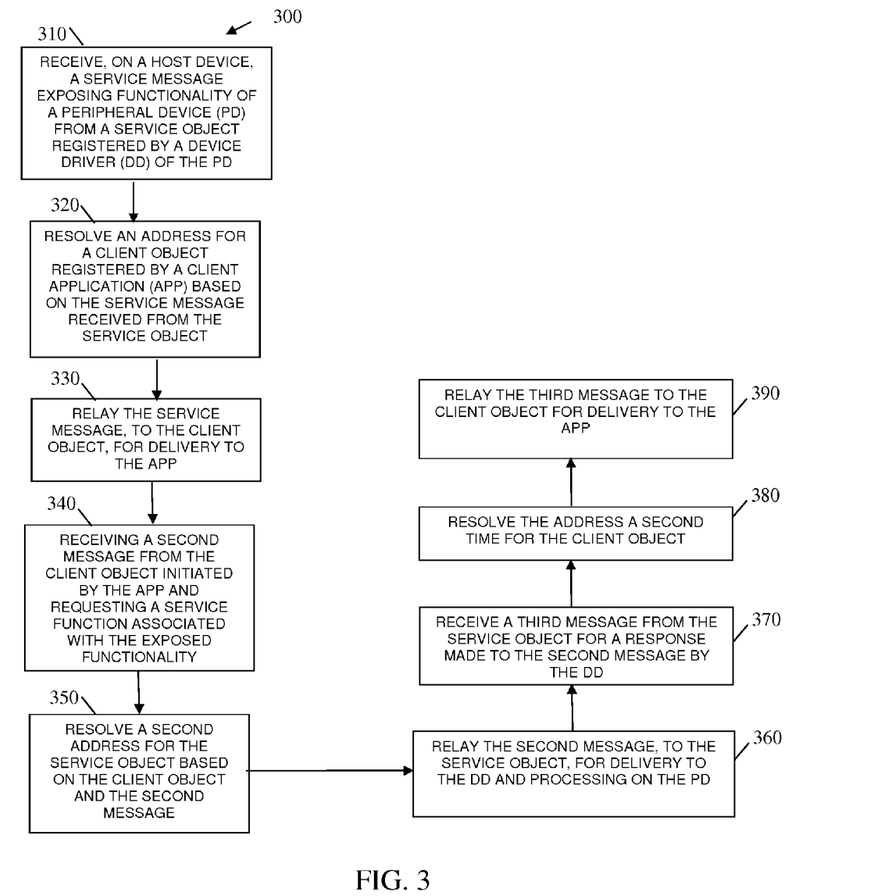
FIG. 3 is a diagram of a method for operating OS independent application and device communications, according to an example embodiment.

FIG. 3 is a diagram of a method 300 for operating OS independent application and device communications, according to an example embodiment. The method 300 is implemented as one or more software modules as executable instructions that are programmed within memory or non-transitory computer readable storage media and executed by a processing device. The software module(s) are referred to herein as an "IPC transport manager." The IPC transport manager has access to one or more networks, and such networks may be wired, wireless, or a combination of wired and wireless.

In an embodiment, the IPC transport manager is partially configured for operation by the message transport configurer of the FIG. 2.

In an embodiment, the IPC transport manager is the post office 114 and any created instances of the post office clients (112B and 113B) and the post office services 112B of the FIG. 1.

In an embodiment, the IPC transport manager executes on the ATM 100.

In an embodiment, the IPC transport manager executes on a SST.

In an embodiment, the IPC transport manager executes on a kiosk.

In an embodiment, the IPC transport manager executes on a retail POS terminal or device.

At 310, the IPC transport manager receives, on a host device that executes the IPC transport manager, a service message exposing functionality of a peripheral device from a service object that is registered by a device driver.

In an embodiment, the device driver is the device driver 121A of the FIG. 1.

In an embodiment, the service object is the post office service 121B of the FIG. 1.

In an embodiment, the peripheral device is the peripheral device 130 of the FIG. 1.

At 320, the IPC transport manager resolves an address a client object registered by a client application based on the service message received from the service object.

In an embodiment, the client object is the post office client (112B or 113B) of the FIG. 1.

In an embodiment, the client application is the client application (111A, 112A, or 113A).

At 330, the IPC transport manager relays the service message, to the client object for delivery to the client application.

According to an embodiment, at 340, the IPC transport manager receives a second message from the client object, which was initiated by the client application, the second message requests a service function associated with the exposed functionality.

In an embodiment of 340 and at 350, the IPC transport manager resolves a second address for the service object based on the client object and the second message.

In an embodiment of 350 and at 360, the IPC transport manager relays the second message, the service object, for delivery to the device driver and processing on the peripheral device.

In an embodiment of 360 and at 370, the IPC transport manager receives a third message from the service object for a response made to the second message by the device driver.

In an embodiment of 370 and at 380, the IPC transport manager resolve the address a second time for the client object.

In an embodiment of 380 and at 390, the IPC transport manager relays the third message to the client object for delivery to the client application.

It is noted that one client application and device driver having one client object and one service object has been illustrated for purposes of comprehension but that there can be multiple different ones of these all operating simultaneously and handled by the IPC transport manager within a single processing environment.

Figure 4:
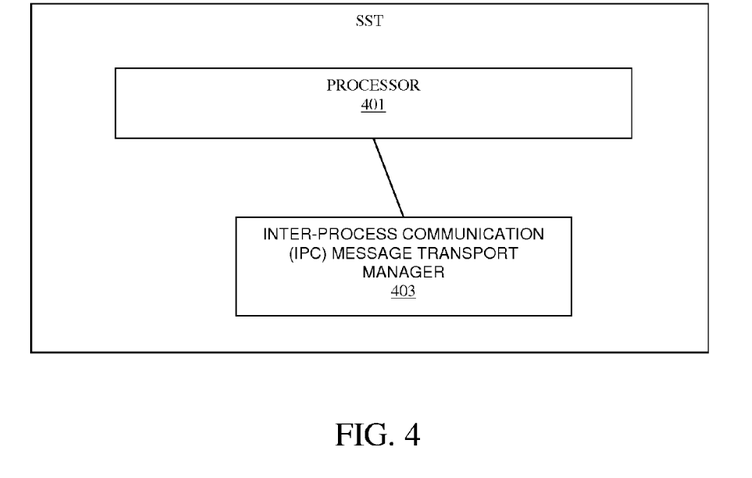
FIG. 4 is a diagram of a Self-Service Terminal (SST) having OS independent application and device communication, according to an example embodiment.

FIG. 4 is a diagram of a Self-Service Terminal (SST) 400 having OS independent application and device communication, according to an example embodiment. The SST 400 includes one or more hardware devices, one or more peripheral devices, and one or more components implemented as one or more software modules as executable instructions that are programmed within memory or non-transitory computer readable storage media and executed by one or more processors of the SST 400. The SST 400 has access to one or more networks, and such networks may be wired, wireless, or a combination of wired and wireless.

In an embodiment, the SST 400 is the ATM 100.

In an embodiment, the SST 400 is a kiosk.

In an embodiment, the SST 400 is a self-service checkout station.

The SST 400 includes a processor 401 and an IPC message transport manager 402.

The IPC message transport manager 402 is configured and adapted to: execute on the processor within its own independent processing context within an OS for the SST 400 and relay messages between client applications and device drivers for peripherals of the SST 400. The message relaying is achieved without imposing any restrictions on the format of the messages and passing the messages in an OS-independent manner.

According to an embodiment, the IPC message transport manager 402 is further configured and adapted to register client objects for the client application and service objects for the device drivers.

In an embodiment, the IPC message transport manager 402 is further adapted and configured to maintain address mappings between the registered client objects and service objects.

In an embodiment, the IPC message transport manager 402 is further and adapted to provide an API to the client applications and the device drivers to create and register client objects and service objects that perform the relays of the messages on behalf of the client applications and the device drivers.

One now fully appreciates how an IPC message transport between applications and devices can be configured and created to provide OS-independent and API independence. This permits for improved reuse of devices by applications independent of third-party APIs and OSs.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
providing, on a processor, an Application Programming Interface (API) to a client application and a device driver;
receiving a client object instantiated by the client application and a service object instantiated by the device driver through the API that permit the client application and the device driver to communicate with one another through messages in formats defined by the client application and the device driver, wherein the messages are relayed and managed in an Operating System (OS)-independent manner; and
registering the client object and the service object through the API.

2. The method of claim 1, wherein registering further includes publishing the service object as being available to the client object.

3. The method of claim 2, wherein publishing further includes receiving an indication from the client object to communicate with the service object.

4. The method of claim 2, wherein publishing further includes receiving an indication from the client object to register for events published by the service object.

5. The method of claim 4, wherein publishing further includes receiving another indication from the client object to register for events broadcast by the service object.

6. The method of claim 1, wherein receiving further includes managing messages between the client object and the service object by mapping each message to an address to which that message is being sent, the address outside an OS processing context from where the message originated.

7. The method of claim 1, wherein receiving further includes queuing a number of the messages for the client object and the service object to pick up, wherein the messages are maintained in a memory buffer until picked up.

8. A method, comprising:
receiving, on a host device, a service message exposing functionality of a peripheral device from a service object registered by a device driver of the peripheral device;
resolving an address for a client object registered by a client application based on the service message received from the service object; and
relaying the service message, to the client object, for delivery to the client application.

9. The method of claim 8 further comprising, receiving a second message from the client object initiated by the client application and requesting a service function associated with the exposed functionality.

10. The method of claim 9 further comprising, resolving a second address for the service object based on the client object and the second message.

11. The method of claim 10 further comprising, relaying the second message, to the service object, for delivery to the device driver and processing on the peripheral device.

12. The method of claim 11 further comprising, receiving a third message from the service object for a response made to the second message by the device driver.

13. The method of claim 12 further comprising, resolving the address a second time for the client object.

14. The method of claim 13 further comprising, relaying the third message to the client object for delivery to the client application.

15. A Self-Service Terminal (SST), comprising:
a processor; and
an Inter-Process Communication (IPC) message transport manager configured and adapted to: i) execute on the processor within its own independent processing context within an Operating System (OS) for the SST, ii) relay messages between client applications and device drivers for peripherals of the SST in an OS-independent manner, without imposing restrictions on the format of the messages, and (iii) register client objects instantiated by the client applications and service objects instantiated by the device drivers.

16. The SST of claim 15, wherein the IPC message transport manager is further and adapted to: iv) maintain address mappings between the client objects and the service objects.

17. The SST of claim 15, wherein the IPC message transport manager is further and adapted to: iv) provide an Application Programming Interface (API) to the client applications and to the device drivers to create and register the client objects and the service objects that perform the relays of the messages on behalf of the client applications and the device drivers.

* * * * *